Patented Jan. 21, 1947

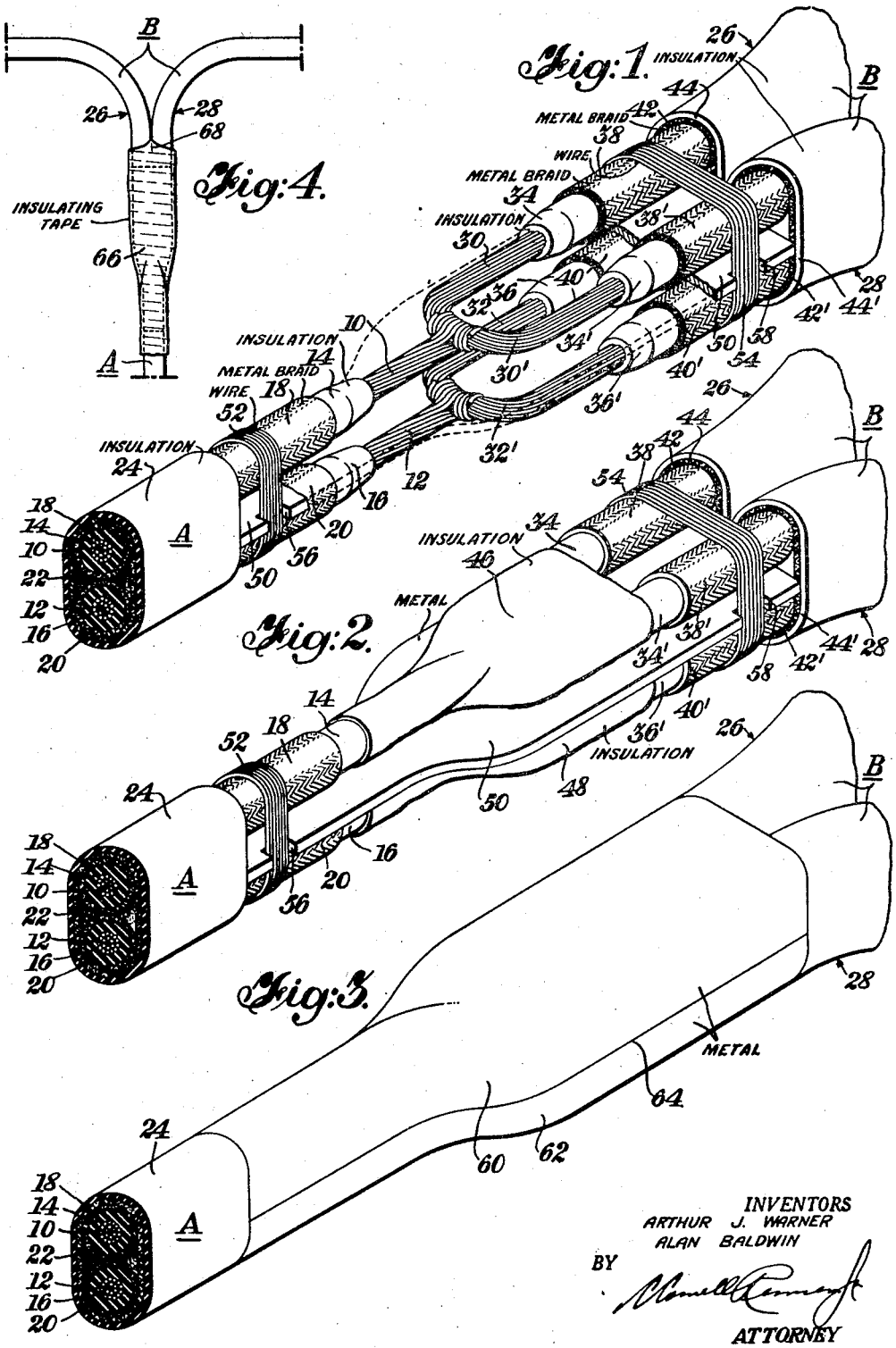

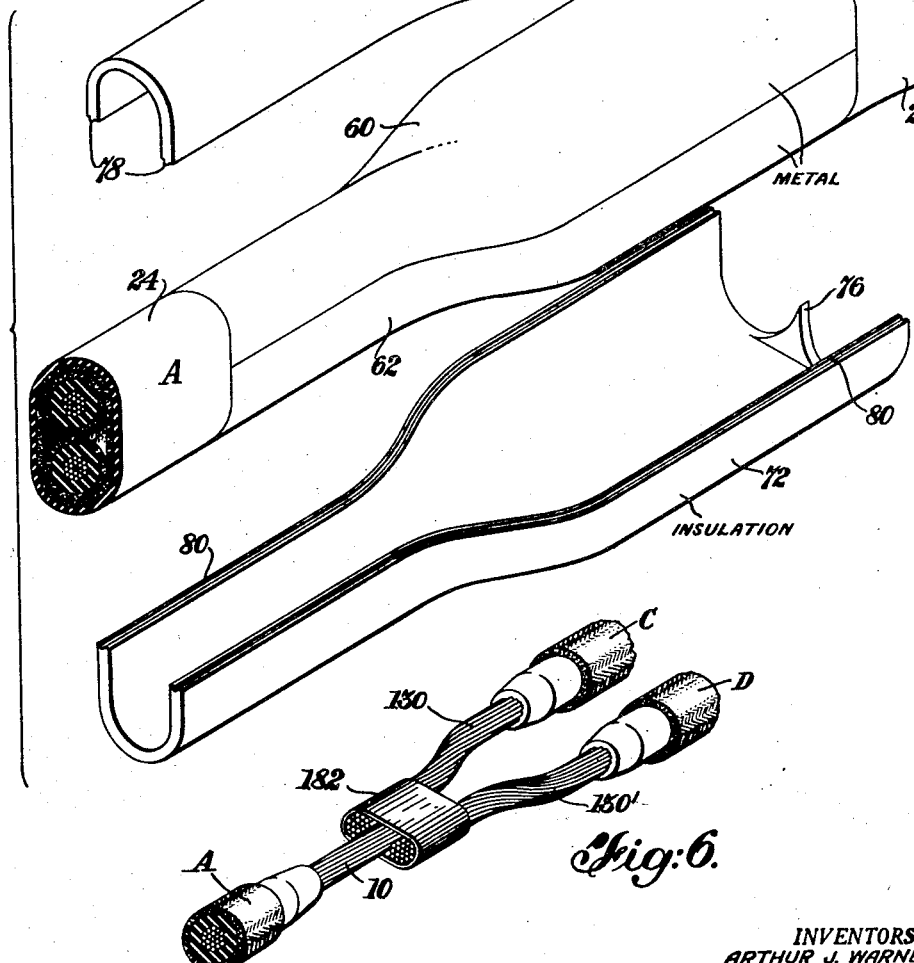

2,414,498

UNITED STATES PATENT OFFICE 2,414,498

CABLE JOINT AND METHOD OF FORMING THE SAME

Arthur J. Warner, South Orange, and Alan Baldwin, Newark, N. J., assignors to Federal Telephone and Radio Corporation, Newark, N. J., a corporation of Delaware Application January 8, 1943, Serial No. 471,672

22 Claims. (Cl. 174—88)

This invention relates to improvements in cable joints and method of forming the same, and more particularly to a novel Y-joint for use in connecting together two-wire cables.

An object of this invention is to provide a Y-joint for cables, which is stronger than previously formed joints.

Another object of this invention is to provide a Y-joint for cables in which tension upon the arms of the Y will not disrupt the joint.

A further object of this invention is to provide a novel method for forming a Y-joint for cables.

A still further object of this invention is to provide a novel Y-joint for high frequency, two-wire cables, in which the wires are properly shielded from one another in the joint.

Generally speaking, the invention is directed to a novel Y-joint for two-wire cables, in which the two arms of the Y consist of one cable bent back upon itself or the adjacent wires of two separate cables and the tail of the Y is formed by the ends of the other cable connected to the common apices of the two arms of the one cable.

Other objects and advantages of the present invention will become apparent from the following detailed description of a preferred form of joint, together with certain modifications thereof, and the method of forming the same, taken in connection with the accompanying drawings, in which:

Fig. 1 is a perspective view of a joint formed in accordance with the present invention, illustrating the manner in which the conductors of one cable are interconnected with the conductors of the other cable;

Fig. 2 is a perspective view, similar to Fig. 1, showing the joint with insulation applied to the interconnected conductors and a stiffening member intermediate the two sets of conductors;

Fig. 3 is a perspective view illustrating the joint shown in Fig. 2 covered by a suitable metal shield;

Fig. 4 is a plan view on a smaller scale, of the completed joint;

Fig. 5 is an exploded view in perspective showing a modified arrangement for covering the joint; and Fig. 6 is a partial perspective view illustrating an alternative connection between the cable conductors.

In the preferred form of joint contemplated by this invention, a cable A is adapted to be interconnected with a second cable B. The cables to be interconnected may be of the type in which, for example, the cable A is provided with a pair of spaced conductors 10 and 12, respectively surrounded with individual insulating coverings 14 and 16, this insulation, in turn, being surrounded by separate metal sheaths 18 and 20, which may, for example, be formed of copper braid. The two sheaths 18 and 20 may, in turn, be surrounded by a common copper braid 22 over which the common outer insulating covering 24 is formed.

In accordance with a preferred arrangement, the cable B is formed with a section bent back upon itself in the form of a V or U, to form a pair of legs 26 and 28. The cable within the leg 26 will be provided with conductors 30 and 32, respectively, surrounded by individual insulating coverings 34 and 36 over each of which is to be found copper braid sheaths 38 and 40. A common copper sheath 42 surrounds the individual copper sheaths 38 and 40, while an outer insulating layer 44 is formed about the sheath 42. The leg 28 of the cable B has conductors 30' and 32' which are obviously continuations of conductors 30 and 32, similar inner insulating coverings 34', 36', individual sheaths 38', 40', common sheath 42', and an outer insulation 44'.

In forming the joint in accordance with the present invention, all insulation is removed from one end of cable A, the copper braids 18 and 20 being removed from the inner insulations 14 and 16 for a short distance back from the end, and the outer insulation 24 and common sheath 22 being cut away from the braid 22 at a further point from the end. The bent-back cable B has all insulation removed from the conductors at an intermediate point, with the individual conductor braids and the common braid and outer insulation being removed in step-back fashion from either side of the bare wire in the same manner as with cable A. The conductor 10 of the cable A is connected by soldering, or in any other equivalent manner, to the common base of the bent-back conductors 30, 30', of the cable, while the conductor 12 is similarly connected to the base of the conductors 32, 32'. The joined conductors are then covered by suitable insulating material. As shown in Fig. 2, the conductors 10, 30 and 30' are provided with common insulation 46, which will surround these conductors on all sides and will be bonded to the inner individual insulating coverings 14, 34, and 34'. Preferably, the insulation 46 is thermoplastic and of the same material as forms the insulating coverings 14, 34 and 34', and is moulded thereto. The conductors 12, 32 and 32' are similarly provided with an insulating coating 48.

Between the two individually insulating joints, there is now inserted a stiffening member 50, preferably of the configuration shown in Fig. 2, so as to generally follow the shape of the joint. The stiffening member 50 may be of such a length that it will extend from the common sheath 22 and outer insulation 24 of the cable A up to the common sheaths 42, 42' and the outer insulating coverings 44, 44' of the cable B. The stiffening member 50 may be held in place between the insulated conductors by binding the same thereto through a wire 52 tightly wrapped about the individual sheaths 18 and 20 of the cable A and the wire 54 wrapped tightly about the individual sheaths 38, 38' and 40, 40' of the two legs of cable B. The stiffening member 50 may, for the purpose of positioning the latter between the joints, be provided with a pair of opposed notches 56 and 58, at opposite ends into which the wire binding 52 and 54 may fit. The member 50, connected as it is between the individual metal sheaths about the conductors will, in addition to serving to stiffen the joint, also act as a conductor for interconnecting the individual metal sheaths. The binding wire 54, in addition to serving to hold the stiffening member 50 in place, also holds together the two legs 26 and 28 of the cable B.

After the stiffening member has been inserted and the cables are bound, as above described, the entire joint between the outer insulated coverings of the two cables is enclosed by a copper shield which may be formed, as shown in Fig. 3, by a pair of cooperating cups 60, 62, having generally the form of the joint, and soldered or otherwise connected together along their opposed or overlapping edges 64 and electrically interconnecting the individual metal braids of the two cables. Additionally, if the stiffening member 50 is made of metal, such as copper, this stiffening member together with the shield 60, 62, forms two separate shielded compartments for the conductors 10, 30 and 30' on the one hand and conductors 12, 32 and 32' on the other hand. Such an arrangement is particularly advantageous if the joint is to be used with cables carrying high and ultrahigh frequencies.

After the copper shield 60, 62, has been applied, the joint is covered with an outer insulation which may be in the form of an insulating tape 66 wound about the shield 60, 62, from the outer insulation 24 of the cable A to the outer insulation of the cable B, in both cases preferably overlapping with such outer insulation. The tape is also wound into the crotch between the legs of the cable B as indicated at 68 in Fig. 4 in order to close off any possible open space which may there appear. The tape 66 is preferably made of an insulating material which is the same as the outer insulation 24, 44, 44'. After the tape has been wound on the joint, it is heated and molded into place to form an integral unit with the outer insulation of the two cables, or, alternatively, the tape may be wound with a cement suitable for the material of which it is made, which will bind the tape into a continuous, impervious insulating layer.

Instead of covering the shield 60, 62 with tape, as described above, it is also possible to insulate this shield by the use of insulating cups, in the manner more fully illustrated in Fig. 5. As there shown, we may use cup-shaped members 70, 72 formed of the same insulating material as surrounds the cables A and B, and of such shape as to closely fit over the metal shields and overlap the cables. These insulating cups are fitted over the joint and moulded together as well as to the cable insulations. The two members may be provided with suitable cooperating tongues and grooves 78, 80 to assure a proper fit, and with respective extensions 74, 76 for closing the crotch of the cable B. Again, the insulating material preferably used for the members 70, 72 as well as for the cable insulation is some thermo-plastic material.

It will be seen that the joint formed in accordance with the present invention is rigid and extremely strong, particularly as against possible disruption in the event of tension being applied to the arms of the Y, tending to pull the joint apart. Pulling apart of the joint is, in such a case, resisted both by the binding 54 and the outer shield formed by the shield cups 60, 62. Moreover, even if two arms of the cable B are pulled apart, the connection with the cable A will still not be broken, since pulling apart of these arms places no tension upon the specific connection of the conductors of the cable B with the conductors of the cable A.

In some instances, where ease in forming the joint is of primary importance, an arrangement such as illustrated in Fig. 6 may be utilized. This arrangement differs from the connection first described in that the arms of the Y are formed not from the bent-back portion of a single cable, but from two ends which may result from the cutting of a single cable or which may be separate ends of two cables C and D. In this case the two conductor ends, such as 130, 130' are soldered to the conductor 10, the connection being covered by a copper sleeve 182. The lower conductors (not shown in Fig. 6) will be similarly interconnected. The rest of the joint, including the moulded insulation about each connection, the intermediate stiffening member, the binding wires, the shielding cups and the outer insulation will be set up in the manner heretofore described. Due to the fact that the wires of the second cable or cables are broken, the joint illustrated in Fig. 6 will not be quite as strong as that shown in Fig. 1, but resistance to rupture is still adequate due to the binding wires, the metal shields and the common outer insulation.

While we have described above the principles of our invention in connection with a specific type of cable, and certain modifications thereof, it is clearly understood that this description is made only by way of example and not as a limitation on the scope of our invention as set forth in the objects and the accompanying claims.

What we claim is:

1. A Y-joint for two-wire cables of the type in which a pair of separately insulated wires are covered by individual metallic sheaths and the sheaths in turn, are surrounded by a common outer insulating covering, comprising a first cable bent back upon itself in the form of a V, a second cable, means for joining one end of the wires of the second cable to the apices of the corresponding wires of the first cable, means for separately insulating each individual joint, a stiffening member between the two insulated joints, said stiffening member extending from the outer insulation of the second cable to the outer insulation of the first, bent-back cable, means for binding together the two wires of the second cable with the stiffening member between them, means for binding the four wires of the first, bent-back cable together with the stiffening member between the wires of each section of bent-back cable, metal covering means enclosing the entire joint between the outer insulations, and insulation covering said metal covering means, said insulation overlapping the outer insulations of the two cables and extending into and between the crotch formed by the first, bent-back cable.

2. The combination according to claim 1, in which said stiffening member is a metal plate inserted between and contacting the metal sheaths of both cables.

3. The combination according to claim 1, in which said stiffening member is a metal plate externally notched near its opposite ends, and said binding means comprises bare wire wound about the metallic cable sheaths and within said notches.

4. A Y-joint for two-wire high frequency cables of the type in which a pair of separately insulated wires are covered by individual metallic sheaths and the sheaths in turn are covered by a common outer insulating covering, comprising a first cable bent back upon itself in the form of a V, a second cable, means for joining one end of the wires of the second cable to the apices of the corresponding wires of the first cable, means for separately insulating each individual joint, a metallic shield between the two insulated joints extending from the outer insulation of the second cable to the outer insulation of the first, bent-back cable, means for joining together the two wires of the first cable with the shield between them, means for binding the four wires of the first, bent-back cable together with the shield between the wires of each section of bent-back cable, metal covering means enclosing the entire joint between the outer insulations and contacting the longitudinal edges of the shield, and insulation covering said metal covering means, said insulation overlapping the outer insulations of the two cables and extending into and between the crotch formed by the first bent-back cable.

5. The combination according to claim 4, in which said metallic shield is a metal plate externally notched near its opposite ends, and said binding means comprises bare wire wound about the metallic cable sheaths and within said notches.

6. The method of connecting two cables together in the form of a Y-joint, each cable consisting of two wires having individual insulation surrounded by individual metal sheaths and a common outer insulation, one cable having all insulation removed from one end, the metal sheaths being removed from each wire for a distance beyond the bare wires, and the outer insulation being removed for a distance back from the end of the inner insulations, and the other cable having all insulation removed from adjacent intermediate sections of both wires, the metal sheaths being removed from the inner insulations of both wires for a distance in each direction from the inner insulations, including the steps of bending the other cable in substantially the form of a V whose apex is formed by the center of its bare wires, connecting the two ends of the wires of the first cable to the corresponding V-shaped sections of the bare wires of the other cable, moulding insulation about the interconnected wires of each individual joint, inserting a stiffening member between the individual insulated joints, binding the two wires of the first cable together, binding the four adjacent wires forming the arms of the V of the other cable together, enclosing the entire joint between the outer insulation of the first cable and the outer insulation of the other cable with a metal sheath, enclosing the metal sheath with a split pre-formed insulating member and moulding said insulation member about said metal sheath, to the outer insulations and between the crotch formed by the two sections of the other cable.

7. The method of connecting two cables together in the form of a Y-joint, each cable consisting of two wires having individual insulation surrounded by individual metal sheaths and a common outer insulation, one cable having all insulation removed from one end, the metal sheaths being removed from each wire for a distance beyond the bare wires, and the outer insulation being removed for a distance back from the end of the inner insulations, and the other cable having all insulation removed from adjacent intermediate sections of both wires, the metal sheaths being removed from the inner insulations of both wires for a distance in each direction and the outer insulation being removed from the metal sheaths for a distance in each direction from the inner insulations, including the steps of bending the other cable in substantially the form of a V whose apex is formed by the center of its bare wires, connecting the two ends of the wires of the first cable to the corresponding V-shaped sections of the bare wires of the other cable, moulding insulation about the interconnected wires of each individual joint, inserting a stiffening member between the individual insulated joints, binding the two wires of the first cable together, binding the four adjacent wires forming the arms of the V of the other cable together, enclosing the entire joint between the outer insulation of the first cable and the outer insulation of the other cable with a metal sheath and wrapping insulating tape over the metal sheath, said insulating tape being wrapped in the overlapping fashion with the outer insulation of both cables and passing between and covering the crotch formed by the two sections of said other cable.

8. The method according to claim 7, in which the two wires of the first cable and the four wires of the second cable are joined together by bare wire extending about the two metal sheaths of the first cable and the four metal sheaths of the second cable.

9. The method according to claim 7, which includes the further step of moulding said insulating tape to form an integral unit with the outer insulation of the cables.

10. The method of joining together two two-wire cables in the form of a Y, which includes the steps of bending one cable back upon itself in the form of a V, connecting the bare conductors at one end of the other cable to corresponding bare conductors at the apex of the V of the one cable, separately insulating each connection, inserting a stiffening between the individually insulated connections, interconnecting the metal sheaths of the two cables and covering the resulting Y-joint with a common outer insulation.

11. The method according to claim 10, which includes the step of binding together the arms of the V of the one cable.

12. The method according to claim 10, which includes the further step of moulding the common outer insulation to the outer insulation of each cable and between the crotch formed by the V of the one cable.

13. A Y-joint for two-wire cables of the type in which a pair of separately insulated wires are covered by individual metallic sheaths and the sheaths in turn are surrounded by a common outer insulating cover, comprising a first cable means consisting of two sections whose wires approach one another in the form of a V, a second cable, means for joining one end of the wires of the second cable to the apex of the V formed by the corresponding wires of the first cable, means for separately insulating each individual joint, a separator between the two insulated joints, means for binding together the two wires of the second cable with the separator between them, means for binding together the four wires of the first cable means with the separator between the wires of each section of the cable means, metal covering means enclosing the entire joint between the outer insulations, and insulation covering said metal covering means, said insulation overlapping the outer insulation and extending into and between the crotch formed by the two cable sections of the first cable means.

14. The combination according to claim 13, in which said separator is of sufficient thickness to assist the resistance of the joint to bending.

15. The combination according to claim 13, in which said separator is a metal shield contacting the metal covering means along its longitudinal edges.

16. The combination according to claim 13, in which said separator is a stiff metal plate inserted between and contacting the metal sheaths of both cables.

17. The combination according to claim 13, in which said metal covering is a longitudinally split copper sleeve, connected together along its edges and joining the metallic sheaths of the one cable with the metallic sheaths of the second cable.

18. The combination according to claim 13, in which the insulation covering said metal covering means comprises a longitudinally split insulating sleeve placed over said metal covering means, moulded together along its adjacent edges, to the outer insulations, and between the crotch formed by the two cable sections of the first cable means.

19. The combination according to claim 13, in which the four wires of said first cable means are formed by the ends of two cable sections, and the means for connecting the ends of the wires of the second cable to the corresponding ends of the wires of the two cable sections includes a pair of sleeves each sleeve surrounding one wire of the second cable and the two corresponding wires of the two cable sections.

20. The method of forming a Y-joint for two-wire cable, which include the steps of forming two cable sections in the form of a V, connecting the bare conductors at one end of the other cable to the corresponding bare conductors at the apex of the V, separately insulating each connection, inserting a metal stiffening member between the individually insulated connections interconnecting the metal sheaths of the cables with a common split cup-shaped metal sleeve fitted about the insulated connections, and covering the resulting Y-joint with a common outer insulation.

21. The method according to claim 20, which includes the further step of moulding the common outer insulation to the outer insulations of each cable and between the crotch formed by the V.

22. The method of forming a Y-joint for two-wire cables, which includes the steps of forming two cable sections in the form of a V, connecting the bare conductors at one end of the other cable to the corresponding bare conductors at the apex of the V, separately insulating each connection, inserting a metal stiffening member between the individually insulated connections, interconnecting metal sheaths of the cables with a common split cup-shaped metal sleeve fitted about the insulating connections, covering the metal sleeve with a split moulded insulating sleeve, and moulding said insulating sleeve together, to the outer cable insulations, and between the crotch formed by the V.

ARTHUR J. WARNER.
ALAN BALDWIN.